Figure 1:
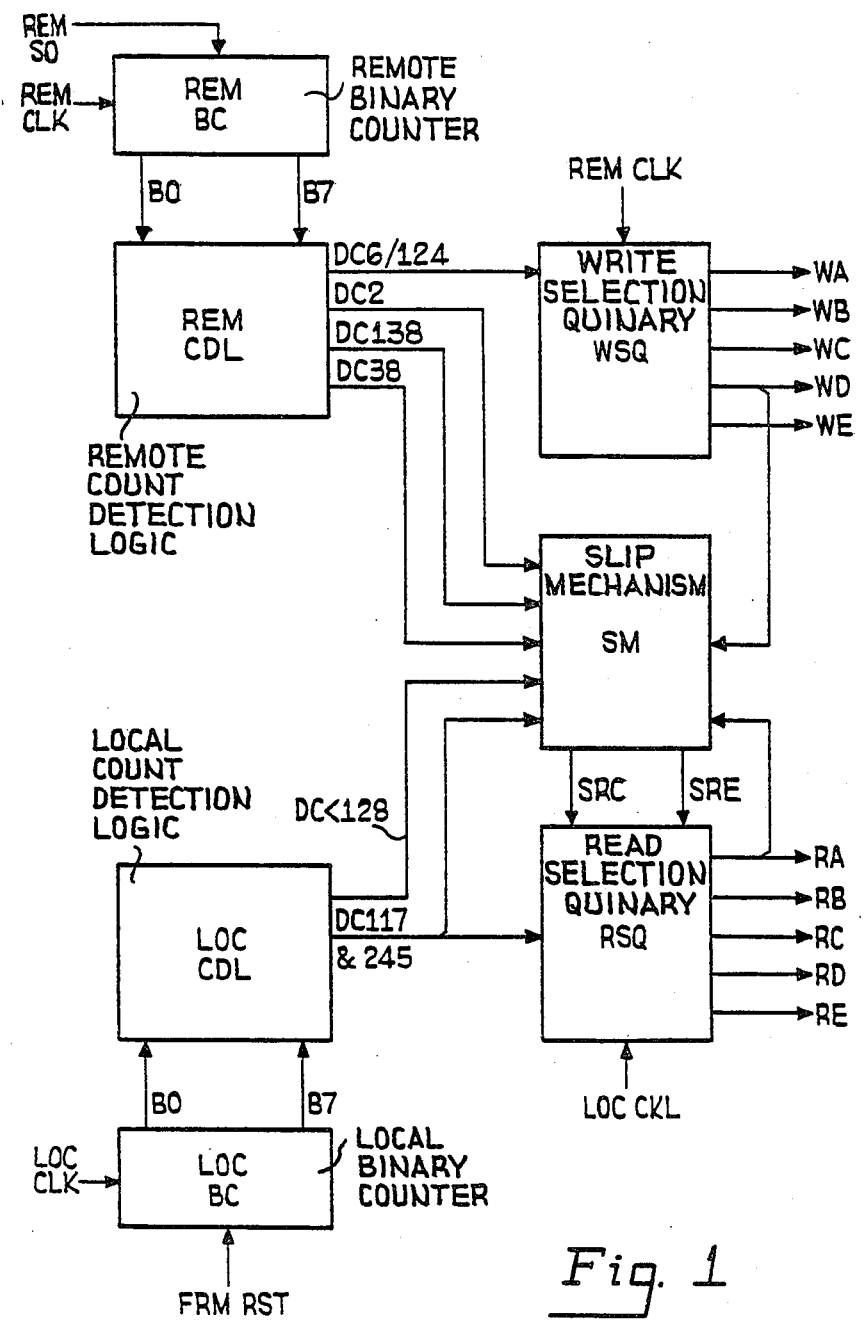

United States Patent [19]

Chopping

[11] 4,368,531
[45] Jan. 11, 1983

[54] FRAME ALIGNER FOR DIGITAL TELECOMMUNICATIONS EXCHANGE SYSTEM

[75] Inventor: Geoffrey Chopping, Poole, England

[73] Assignee: The Plessey Company Limited, Ilford, England

[21] Appl. No.: 175,780

[22] Filed: Aug. 6, 1980

[30] Foreign Application Priority Data

Oct. 10, 1979 [GB] United Kingdom ................ 7927859

[51] Int. Cl.³ .............................................. H04J 3/06
[52] U.S. Cl. .................................... 370/100; 375/118
[58] Field of Search ............... 370/100, 108; 375/111, 375/118

[56] References Cited

U.S. PATENT DOCUMENTS

| | | | |
|---|---|---|---|
| 3,531,777 | 9/1970 | West | 375/118 |
| 3,830,980 | 8/1974 | Peron et al. | 370/100 |
| 4,121,057 | 10/1978 | Luder | 370/100 |

Primary Examiner—Douglas W. Olms
Attorney, Agent, or Firm—Fleit & Jacobson

[57] ABSTRACT

An aligner is used in a digital telecommunications switching system for correcting the drift between the exchange clocking system and the incoming digital line terminated on the digital line termination units DLT. Typically aligners consists of so-called "elastic-lengthed" buffers having two frames worth of storage arranged such that the line information is written into one "frame area" while the time switch is fed from the other "frame area" and vice versa for each successive frame. Such an arrangement has severe limitations from a fault finding point of view. The aligner of the invention consists of a "single chip" containing a set of five half frame serial shift registers together with read and write address counters and associated logic to ensure that separate "read' and "write" shift registers are maintained. The use of five half frame shift registers through which the serially received data is passed allows the sync channel (time slot zero) to be monitored which ensures that the aligner is functioning correctly because the sync channel is fed through all the locations of the aligner. The sub-division of the total store into odd numbers allows each register selection to be checked periodically for the appearance and non-appearance of the synchronization pattern. In addition the checkable channel pattern is arranged to be the last entry written to each register before the counter moves to a new register, hence, the counter itself is checked across its full range.

6 Claims, 2 Drawing Figures

FRAME ALIGNER FOR DIGITAL TELECOMMUNICATIONS EXCHANGE SYSTEM

The present invention relates to frame aligners for telecommunication exchanges handling digital information in for example time-division-multiplex form.

In large national telecommunication networks the transmission of digital information in the network can not be handled on a completely synchronised basis and arrangements have to be provided in the exchanges of the network to handle the drift between the multiplex on the junctions and the exchange multiplex.

In prior art systems it is well known to use aligners employing random access memories (RAM). Such aligners are provided one for each junction and the incoming multiplex is written a channel at a time into the RAM under the control of addressing arrangements driven by clocking signals derived from the junction multiplex, whereas the RAM is read under the control of addressing arrangements driven by the exchange clocking signals. In addition each aligner includes clash detection logic arrangements to prevent the address counters from passing each other due to the relative drift between the clocking arrangements.

The use of random access memories has a particular disadvantage in that such memories have several failure modes which only affect one or more time slots without affecting all time slots. For example, a single bit in one location may "stick" at the one or zero state or various addresses may become unaccessible by address logic failures. It is necessary to routine the entire random access memory to find such faults and such a routining has to be performed "off line".

It is an aim of the present invention to provide an aligner which may readily be tested and routined throughout all its location in a simple manner.

According to the invention there is provided a frame aligner for use in a time division multiplex communication system in which a digital data bit-stream is transmitted over a data highway interconnecting a first communication exchange and a second communication exchange, each exchange incorporating its own clock arrangement for defining a time division multiplex frame and bit periods within a frame and the frame aligner includes five half frame shift register sections, each section being independently accessible for read and write operations, a read select counter arranged to select on a mutually exclusive basis the half frame shift register section from which the next half frame of information is to be read, a write select counter arranged to select on a mutually exclusive basis the half frame shift register section into which the next half frame of information received on the data highway is to be fed and a slip mechanism which monitors the incoming clock and the exchange clock to ensure that the read and write counters do not concurrently select the same shift register section.

With such an arrangement the synchronisation channel will be passed through all the aligner's locations during its normal on line operation and the sub-division of the total store into an odd number of register sections allows each section to be periodically checked for the appearance and non-appearance of the synchronisation pattern. In addition the synchronisation channel 0 pattern is arranged to be the last entry written to each register before the counter moves to a new register. Hence the counters themselves are checked across their full range.

Figure 2:
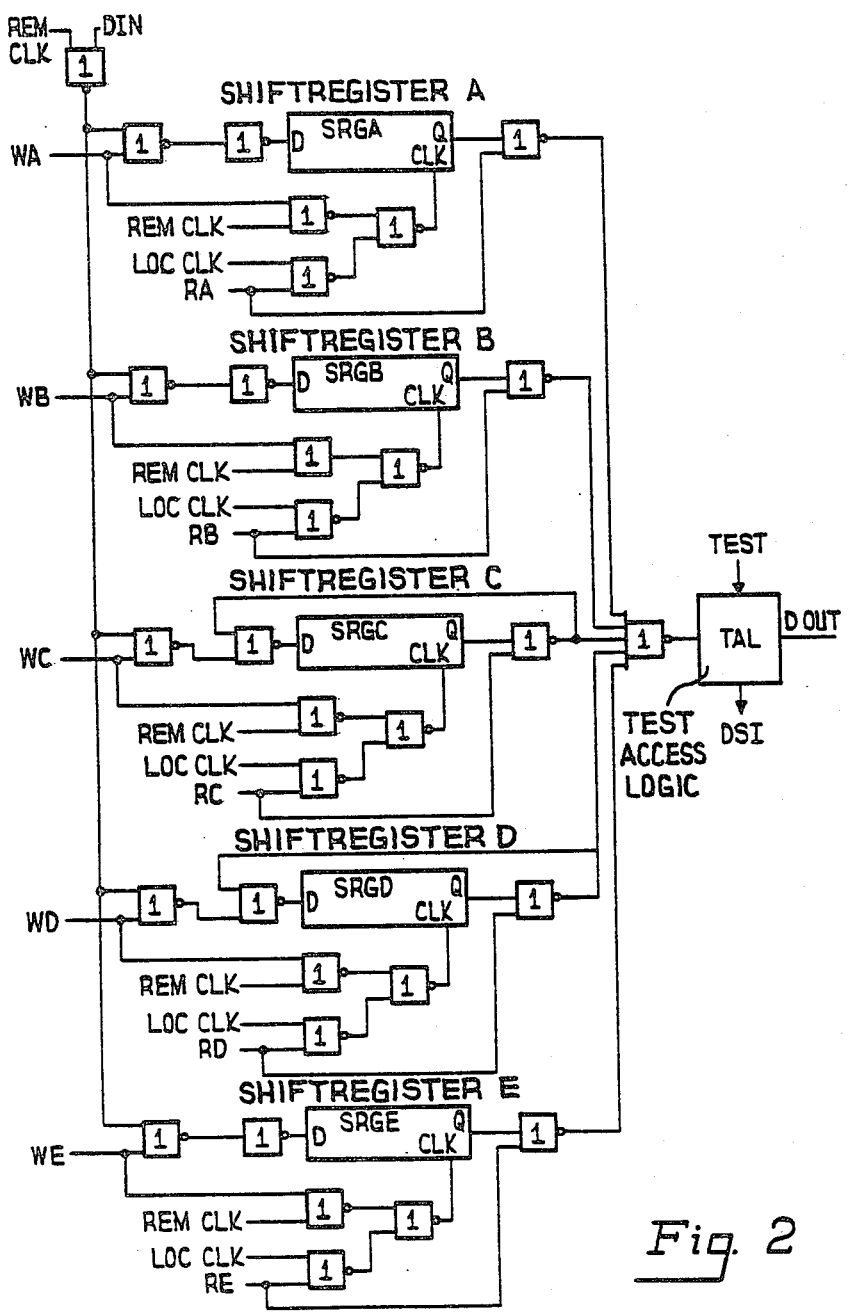

The invention together with its various features will be more readily understood from the following description which should be read in conjunction with the accompanying drawings. Of the drawings:

FIG. 1 shows a block diagram of the read/write control logic for the aligner shift register sections according to the embodiment of the invention, whereas, FIG. 2 shows a block diagram of the shift register sections used in the aligner according to the embodiment of the invention.

The equipment of the invention is used in so-called digital telephone exchanges handling pulse code modulated time division multiplex junctions and is used to align the incoming pulse code modulated time-division-multiplexed data streams with the clock system of the exchange. Typically each time division multiplex junction handles 32 channels of information with each channel having eight bits of p.c.m. encoded information operation at 2:048 Mb/s. The information streams are usually transmitted over the junctions in serial form using HDB3 coding and it will be appreciated therefore that each frame of information involves 256 bits (i.e. 32 channels of 8 bits each). Typically the HDB3 coding includes remote clock information which is recovered from the bit stream to act as the remote clock REM CLK for the aligner.

Referring firstly to FIG. 1 the read/write control logic will be considered. The control logic consists of a write selection quinary circuit WSQ, a read selection quinary circuit RSQ, a slip mechanism SM and a remote synchronisation binary counter REMBC and a local synchronisation binary counter LOCBC. The synchronisation binary counters are eight bit devices driven by the remote (REM CLK) and local (LOC CLK) clocks respectively. Associated with each counter is a count detection logic REM CDL and LOC CDL respectively and these devices are used to generate signals when particular states of count are detected to cause the write selection quinary WSQ and the read selection quinary RSQ to change state to select a different shift register section to be used for the write and read operations performed during the next half frame period. These "half frame register section selection" signals are shown as WA to WE inclusive for the write selection signals and RA to RE inclusive for the read selection signals. The quinary circuits WSQ and RSQ operate as linear counters having five stages of count and they are initially conditioned to select different half frame registers and they are stepped on for each half frame. The half frame conditions for the remote multiplex are detected by the remote count detection logic REM CDL (signal DC6/124) and for the local multiplex by the local count detection logic LOC CDL. The states of count detected (i.e. six and 124 for the write selection quinary counter and 117 and 245 for the read selection quinary) are "phased" to take into account that the WA to WE and RA to RE signals are generated under remote clock REM CLK and local clock LOC CLK control. In addition the synchronisation counters REM BC and LOC BC are synchronised to remote time slot zero (signal REM SO) generated in a clock extraction interface driven from the remote junction and the local frame reset signal FRM RST.

The aligner must ensure that the read mechanism is not one half frame out of sequence; a register section is not written to and read from at the same time; slips of a whole frame only are required to occur after start-up; slips occur only between time slot zero and time slot one boundaries and the equipment is self starting after power on if the internal clocks are running. The operations are handled by the slip mechanism SM which is also provided with count detection inputs. The conditions of count used by the slip mechanism relate mainly to the remote binary counter REM BC and these are states of count of two (DC2); one hundred and thirty eight (DC138) and thirty eight (DC38) together with a state of count of one hundred and seventeen and two hundred and forty-five on the local counter LOC BC. In addition a signal DC<128 is generated to indicate that the state of count in the local counter is LOC BC is less than 128.

Finally the slip mechanism is fed with an indication of when the write selection quinary WSQ reaches a state of count of four (i.e. WD selected) and an indication of when the read selection quinary RSQ reaches a state of count of one (i.e. RA selected) and read selection quinary control leads SRC and SRE allow the slip mechanism SM to set the read selection quinary RSQ to a state of three (i.e. RC selected) or a state of five (i.e. RE selected).

The data handling arrangement of the aligner is shown in FIG. 2 and it consists of five 128 bit shift registers SRGA, SRGB, SRGC, SRGD and SRGE. Each register section is fed by clocked data from the data in lead DIN recovered from the incoming junction in accordance with the state of the write selection quinary WSQ. The shift registers are clocked on their CLK input for write operations by the remote clock REM CLK. Hence for any one remote half frame each incoming data bit is fed into the D input of a selected register section in accordance with which select lead WA to WE is activated. The shift register to be used to supply the data out lead DOUT is similarly selected by the state of count in the read selection quinary RSQ. The shift registers are clocked on their CLK input for read operations from the local clock LOC CLK in accordance with the active read select RA to RE lead. The active read select lead also opens the corresponding output gate allowing the contents of the read selected shift register section to be passed to the data output lead DOUT by way of an OR gate and test access logic TAL. The test access logic allows a pattern to be inserted on to the data output lead DOUT or for the data stream passing to the data output lead DOUT to be monitored by for example the exchange common control equipment on lead DSI.

The basic operation of the aligner is as follows. The five register sections SRGA, SRGB, SRGC, SRGD and SRGE are written to in turn for each half cycle of the incoming multiplex on lead DIN under remote clock REM CLK control whereas the five register sections are read in turn on a mutually exclusive basis from that being written to.

Every fifth frame register section SRGA starts to be written to with time slot one. Register section SRGE has finished being written to and contains data starting with time slot 17. Consequently one of the other three register sections SRGB, SRGC or SRGD should be being read from according to the state of the read selection quinary RSQ. Register sections SRGB and SRGD contain data starting with time slot one and register section SRGC contains data starting with time slot 17.

When a time slot one is required to be read a new register has to be selected. This selection can occur up to 256 bits in delay from the start of the write to register section SRGA.

Register sections SRGE and SRGC contain Time Slot 17 and are therefore unsuitable. Register section SRGB contains Time Slot one, but Register section SRGB will be required to be written in 128 bit periods after the start of the write to Register section SRGA and therefore the read must not be allowed to start from Register section SRGB.

Thus if the read starts from Register section SRGD the correct data should be obtained, but a problem can occur if the DELAY between the start of writing to register section SRGA and the start of reading from register section SRGD is approaching 256 bits. If in the time another five frames have past, the writing mechanism has been running faster than the reading mechanism, then a register section may be being written to and read from at the same time. This is not permissable. Thus a limit of 252 bit periods is set for the DELAY, if register section SRGD is to be read from. The specification of slipping a maximum of 4 bit periods in 5 frames (625 milliseconds) is therefore set for this type of aligner.

If the DELAY between writing to register section SRGA and starting a read from a new register section is greater than 128 bit periods (half a frame)+4 bits i.e. 132 bit periods, then register section SRGA will no longer be being written to, and will contain data starting with a Time Slot one.

Thus two places exist from where a Time Slot one half frame may be found subject to limits on the DELAY.

DELAY=0–251 bits Register section SRGD
DELAY=132–255 bits Register section SRGA

The actual decision range has to be greater than 256 bit periods. Because of drift, it is not possible to ensure that a start of a Time Slot One Read will occur within 256 bits of a start of a Time Slot one write to register section SRGA.

The range has to be extended and is −4 to 287 bits.

It is not possible to ensure that 2 starts of a Time Slot One Read will not occur in the decision range.

Therefore, the condition for starting a Read from Register section SRGD is DELAY=−4 to 251 bits and from Register section SRGA is DELAY=132 to 287 bits.

When 2 starts of a Time Slot One Read occur and because of drift the decision mechanism requests two Reads to start from Register D then the second one will not be permitted.

If the DELAY lies between the 132 and 252 bit periods then either register section SRGA or SRGD may be read from. This is a range of 120 bit periods.

The Aligner has a memory element which is only loaded when the DELAY does not lie in the range 132 to 252 bit periods and it is loaded with whether Register section SRGA or SRGD was read from on that occasion. This means that when a drift occurs into the 132 to 252 bit periods region no slip occurs. A Slip will occur when a drift from the 132 to 252 bit region takes place, if the boundary crossed causes the memory element to change state.

A drift can cause the 0/256 boundary to be crossed and the state of the memory element to change, but no Slip occurs.

For a further Slip to occur a drift in the same direction of 256 bit periods must occur or a drift in the opposite direction of 120 bit periods.

So the selection of which register section is to be read from, is normally the next one round the cycle and every five frames, as determined by the writing mechanism, the place from which the read occurs is forced. This will always be the next register round the cycle except under slip, start-up and fault conditions.

The slip mechanism SM receives the various states of counts of the two binary counters REM BC and LOC BC together with the RA and WD conditions from the read selection quinary RSQ and the write selection quinary WSQ and in accordance with the above requirements forces the state of the read selection quinary RSQ by activating the select RC or select RE leads SRC or SRE every five frames if necessary.

From the above it can be seen that the serial $2\frac{1}{2}$ frame aligner overcomes the problems inherent in a two frame RAM type aligner because it passes data by way of five 128 bit half frame shift register sections. While data is being written to one of the register sections data is being read from another.

In a ten frame cycle each 128 bit serial register section passes one Sync. pattern and one Non-Sync. pattern down its whole length.

Time Slot Zero and Time Slot 16 are always the last Time Slots to be written in and read out of the 128 bit serial registers.

Thus if an alarm monitor unit monitors Time Slot Zero and sees Sync. and Non-Sync. patterns occurring at the correct intervals it can be assured that all the data is being passed through the aligner satisfactorily because the following failure modes have been protected against.

128 bit register sections not being written to;

128 bit register sections not being cycled in the correct sequence;

malfunction of one or more 128 bit register sections timing errors in the change over between 128 bit register sections writing an incorrect number of bits into a 128 bit register section and reading an incorrect number of bits from a 128 bit register section.

The aligner of the embodiment is ideally suited for large scale integrated circuit implementation.

The embodiment described above, it will be realised is explanatory only and alternative arrangements will readily be seen by those skilled in the art. For example the functions provided by the equipment of FIG. 1 could be replaced by a suitable programmed microprocessor.

What we claim is:

1. A frame aligner for use in a time division multiplex communication system in which a digital data bit stream is transmitted over a data highway interconnecting a first communication exchange and a second communication exchange, each exchange incorporating its own individually operating clock arrangement for defining time division multiplex frame and bit periods within a frame and the frame aligner includes five half frame shift register sections, each section being independently accessible for read and write operations, a read select counter arranged to select on a mutually exclusive basis the shift register section from which the next half frame of information is to be read, a write select counter arranged to select on a mutually exclusive basis the shift register section into which the next half frame of information received on the data highway is to be fed and a slip mechanism which monitors the incoming clock and the exchange clock and controls the read select and write select counters so that they do not concurrently select the same shift register section.

2. A frame aligner as claimed in claim 1 in which the incoming data clock drives a remote counter and the exchange clock drives a local counter each counter having one state of count for each bit in a frame and the slip mechanism monitors the states of the remote counter and the local counter to detect a potential clash between the remote and local clocks.

3. A frame aligner as claimed in claim 2 in which the slip mechanism forces the read select counter to a new state of count each time it detects a potential clash.

4. A frame aligner as claimed in claim 3 in which each register section consists of a shift register having 128 stages, a single data input, a single data output and a single clock lead.

5. A frame aligner as claimed in claim 4 in which the data input path includes gating devices controlled by the write select counter and the data output path includes gating devices controlled by the read select counter and the clock path includes a first gating device controlled by the remote clock and the write select counter and a second gating device controlled by the local clock and the read select counter.

6. A method of aligning a digital data bit-stream transmitted over a data highway interconnecting a first communication exchange and a second communication exchange, each exchange incorporating its own individually operating clock arrangement for defining time division multiplex frame and bit periods within a frame and the method includes the steps of (i) storing each successive half frame of incoming information in a separate one of five half frame storage areas under the control of the incoming clock, (ii) reading each successive half frame cyclically from a different storage area than that currently being used to store the incoming half frame and (iii) monitoring the incoming clock and the local clock and adjusting the reading cycle to ensure that reading and storing operations are not performed on the same storage area.

* * * * *

UNITED STATES PATENT AND TRADEMARK OFFICE
CERTIFICATE OF CORRECTION

PATENT NO. : 4,368,531
DATED : January 11, 1983
INVENTOR(S) : Geoffrey Chopping

It is certified that error appears in the above-identified patent and that said Letters Patent is hereby corrected as shown below:

After "(30) Foreign Application Priority Data" the date should read -- Aug. 10, 1979 --.

Signed and Sealed this

Ninth Day of October 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,368,531
DATED : January 11, 1983
INVENTOR(S) : Geoffrey CHOPPING

It is certified that error appears in the above-identified patent and that said Letters Patent is hereby corrected as shown below:

On the title page:
Line "[73] Assignee:" the assignee's name should read
--The Plessey Company plc--.

*Signed and Sealed this*

*Fourteenth* Day of *May 1985*

[SEAL]

*Attest:*

DONALD J. QUIGG

*Attesting Officer*     *Acting Commissioner of Patents and Trademarks*